US010672062B2

(12) United States Patent
Higgins et al.

(10) Patent No.: US 10,672,062 B2
(45) Date of Patent: Jun. 2, 2020

(54) SYSTEMS AND METHODS FOR MANAGING SHOPPING LISTS AND SHOPPING ROUTES

(71) Applicant: EBAY INC., San Jose, CA (US)

(72) Inventors: Krystal Rose Higgins, San Jose, CA (US); John Richard Tapley, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 1009 days.

(21) Appl. No.: 14/468,229

(22) Filed: Aug. 25, 2014

(65) Prior Publication Data
US 2015/0186982 A1 Jul. 2, 2015

Related U.S. Application Data

(60) Provisional application No. 61/922,021, filed on Dec. 30, 2013.

(51) Int. Cl.
*G06Q 30/06* (2012.01)
*H04W 4/80* (2018.01)
(52) U.S. Cl.
CPC ..... *G06Q 30/0639* (2013.01); *G06Q 30/0633* (2013.01); *H04W 4/80* (2018.02)
(58) Field of Classification Search
None
See application file for complete search history.

(56) References Cited

U.S. PATENT DOCUMENTS

| 8,880,100 | B2* | 11/2014 | Dobyns | H04W 4/023 455/456.3 |
| 2004/0172191 | A1* | 9/2004 | Vitikainen | G01C 21/32 701/426 |
| 2010/0082447 | A1* | 4/2010 | Lin | G06Q 30/0601 705/26.1 |
| 2012/0310758 | A1* | 12/2012 | Bai | G06Q 30/0633 705/23 |
| 2014/0073345 | A1* | 3/2014 | Chintalapudi | G01C 21/165 455/456.1 |
| 2014/0129378 | A1* | 5/2014 | Richardson | G06Q 30/0639 705/26.8 |

(Continued)

OTHER PUBLICATIONS

Ludford, Pamela J., et al. "Capturing, sharing, and using local place information." Proceedings of the SIGCHI conference on Human factors in computing systems. ACM, 2007. (Year: 2007).*

*Primary Examiner* — Michelle T Kringen
(74) *Attorney, Agent, or Firm* — Haynes and Boone, LLP

(57) ABSTRACT

A system or method is provided to monitor a consumer's shopping routes associated with shopping lists. A location and movements of the consumer in a merchant's store may be monitored using a network of Bluetooth beacons installed throughout the merchant's store. When the consumer picks up a product from a store shelve and crosses out an item from a digital shopping list, the system may mark the location where the merchandise is picked up. Thus, a shopping route of the consumer may be detected as the consumer picks ups and crosses out various products listed on the shopping list during the shopping trip in the store. The consumer may share the shopping route with another consumer. The shopping route may be shared in real time, such that another consumer may make suggestions or comments or approve various items picked up by the consumer in real time.

19 Claims, 5 Drawing Sheets

(56) References Cited

U.S. PATENT DOCUMENTS

| | | | |
|---|---|---|---|
| 2014/0156461 A1* | 6/2014 | Lerner | G06Q 30/0623 705/26.61 |
| 2014/0172628 A1* | 6/2014 | Argue | G06Q 30/0261 705/26.8 |
| 2014/0335897 A1* | 11/2014 | Clem | G08G 1/0112 455/456.3 |
| 2015/0019391 A1* | 1/2015 | Kumar | G07G 1/0036 705/28 |
| 2015/0073980 A1* | 3/2015 | Griffin | H04W 4/008 705/39 |
| 2015/0088641 A1* | 3/2015 | Aoki | G06Q 30/0251 705/14.49 |

* cited by examiner

200

SYSTEMS AND METHODS FOR MANAGING SHOPPING LISTS AND SHOPPING ROUTES

RELATED APPLICATION

This application claims priority and benefit of U.S. Provisional Application 61/922,021 filed Dec. 30, 2013, all of which is incorporated herein by reference in its entirety.

BACKGROUND

Field of the Invention

The present invention generally relates to systems and methods for managing shopping lists and shopping routes.

Related Art

Consumers utilize shopping lists to help facilitate in-store shopping. For example, a consumer may use an application on a mobile device to generate a shopping list. The shopping list may include various merchandise to be purchased at a merchant's store. When the consumer visits the merchant's store, the consumer may use the shopping list as a reminder to purchase the merchandise listed in the shopping list. Although the shopping lists may remind consumers of the merchandise to be purchased, the consumers may still need to find the locations of these merchandises in the merchant's store, which may be time consuming and may cause consumer inconvenience. Thus, there is a need for a system or method that helps managing shopping lists and shopping routes associated with the shopping lists.

Figure 1:
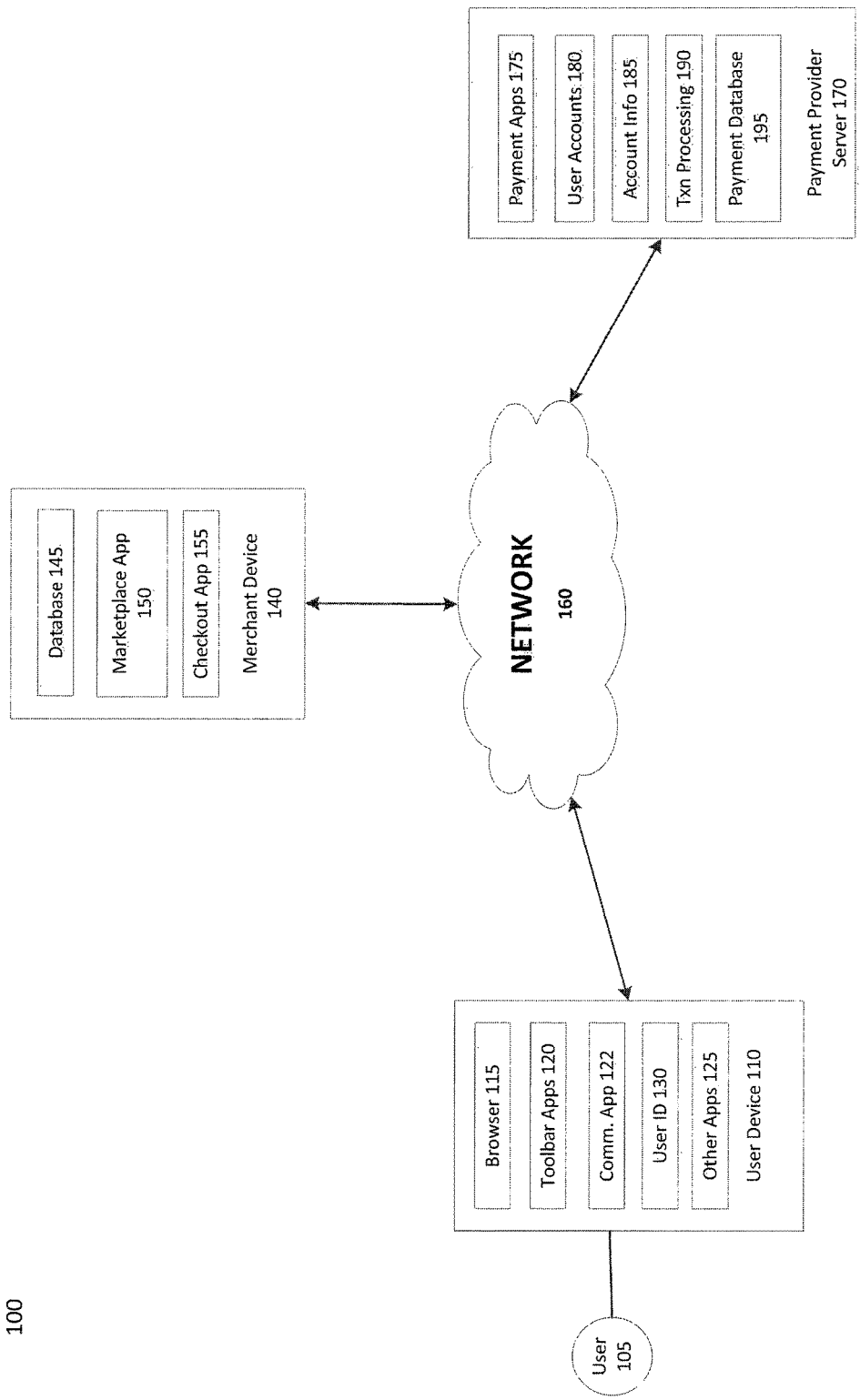
FIG. 1 is a block diagram of a networked system suitable for managing shopping lists and shopping routes according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system or method is provided to monitor a consumer's shopping routes associated with shopping lists. A location and movement of the consumer in a merchant's store may be monitored by detecting a location of the consumer's mobile device via Bluetooth Low Energy (BLE) communication using a network of BLE devices, such as beacons, positioned throughout the merchant's store. When the consumer picks up a product from a store shelf and crosses out or otherwise deletes or marks as picked up an item from a digital shopping list, the system may mark the location where the merchandise is picked up. Thus, a shopping route of the consumer may be mapped as the consumer picks ups and crosses out various products listed on the shopping list during the shopping trip in the store. The shopping route associated with the shopping list may be stored for future reference. By collecting various shopping routes for various shopping lists from consumers, the system may analyze these shopping routes and suggest a shopping route to a consumer when another shopping list is presented to the system.

In an embodiment, the consumer may share the shopping route with another consumer. For example, the shopping route may be shared with a family member. Thus, when a primary shopping person in the household is not available to go shopping, another family member may use the primary shopping person's shopping list and shopping route to shop more efficiently. Further, the shopping route may be shared in real time, such that the primary shopping person may make suggestions or comments or approve various items picked up by the family member when the family member is shopping. Thus, two or more people may share the shopping experience.

FIG. 1 is a block diagram of a networked system 100 suitable for implementing a process for managing shopping routes associated with shopping lists according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, and a payment provider server 170 in communication over a network 160. Payment provider server 170 may be maintained by a payment service provider, such as PayPal, Inc. of San Jose, Calif. A user 105, such as a sender or consumer, utilizes user device 110 to perform a transaction using payment provider server 170. User 105 may utilize user device 110 to initiate a payment transaction, receive a transaction approval request, or reply to the request. Note that transaction, as used herein, refers to any suitable action performed using the user device, including payments, transfer of information, display of information, etc. For example, user 105 may utilize user device 110 to display and manage shopping lists at merchant locations. Although only one merchant server is shown, a plurality of merchant servers may be utilized if the user is purchasing products or services from multiple merchants.

In some embodiments, user device 110 may download a shopping application from payment provider server 170 or from merchant server 140. The shopping application may allow user 105 to compose shopping lists listing items to be purchased at the merchant's store. User device 110 may include a Bluetooth device configured to implement low energy Bluetooth communication. A network of low energy Bluetooth beacons may be installed at various locations inside the merchant's store. Thus, the location and movements of user device 110 in the merchant's store may be determined by detecting the various Bluetooth beacons installed in the merchant's store. When user 104 utilizes the shopping application on user device 110 to purchase or pick up items on a shopping list, the locations and movements of user 104 in the merchant's store may be monitored.

User device 110, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, personal digital assistant (PDA), laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may include a Bluetooth device configured to implement low energy Bluetooth communication. For example, user device 110 may detect various low energy Bluetooth signals from Bluetooth beacons installed in a merchant's store. Thus, locations and movements of user device 110 may be determined by positioning techniques, such as triangulation or location fingerprinting.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers. For example, a payment may be a donation to charity or a deposit to a saving account. Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Merchant server 140 may be connected to a network of Bluetooth beacons installed in the merchant's brick-and-mortar store. The network of Bluetooth beacons may be installed at respective locations throughout the merchant's store to form a grid. Each Bluetooth beacon may emit a low energy Bluetooth signal in specific frequency spectrum periodically. Thus, the network of Bluetooth may allow detection of locations and movements of consumer in the merchant's store. In some embodiments, merchant server 140 may maintain a database that stores shopping lists and shopping routes of consumers for purchases made at the merchant's store. The shopping lists may be created by consumers as reminders for items to be purchased at the merchant's store. The shopping routes may be routes taken by the consumers in the merchant's store when making purchases of various items on the shopping lists.

Payment provider server 170 may be maintained, for example, by an online payment service provider which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

In some embodiments, payment provider server 170 may maintain a database including shopping lists and routes associated with each user. The shopping lists may be created by users for items that are to be purchased at a merchant. The shopping routes are routes taken by users when the users are shopping in a merchant's store. The database may organize the shopping routes and shopping lists by each user or by each merchant Payment provider server 170 may periodically update the shopping lists and shopping routes to add new shopping lists created by the uses and shopping routes taken by the users.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment using various selected funding instruments. As such, transaction processing application 190 may store details of an order from individual users, including funding source used, credit options available, etc. Payment application 175 may be further configured to determine the existence of and to manage accounts for user 105, as well as create new accounts if necessary.

Figure 2:
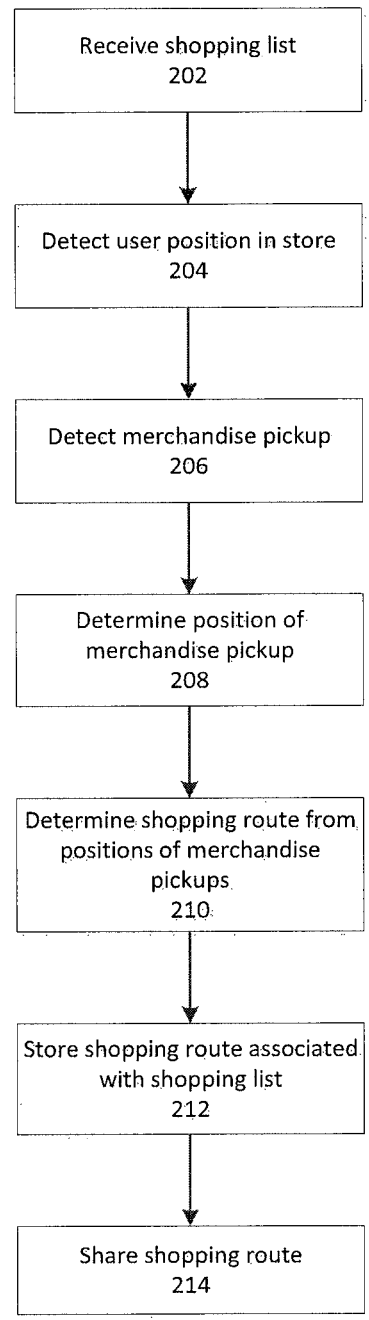
FIG. 2 is a flowchart showing a process of monitoring and storing shopping routes according to one embodiment.

FIG. 2 is a flowchart showing a process 200 for monitoring and storing shopping routes according to one embodiment. At step 202, user device 110 may receive a shopping list. For example, user 105 may create a shopping list using user device 110 by entering various items to be purchased at a merchant's store. In particular, user 105 may use a shopping application downloaded from merchant device 140 or payment provider server 170 to create a digital shopping list. The shopping list may include a checklist of items to be purchased. Each item on the list may include a check box. User 105 may check off an item when the item has been picked up to be purchased.

At step 204, the position and movement of user 105 in the merchant's store may be detected. For example, a network of Bluetooth beacons may be installed in the merchant's store. Each Bluetooth beacon may be installed at a specific location in the merchant's store and may emit low energy Bluetooth signals. Thus, a grid of Bluetooth beacons may be formed in the merchant's store.

Figure 5:
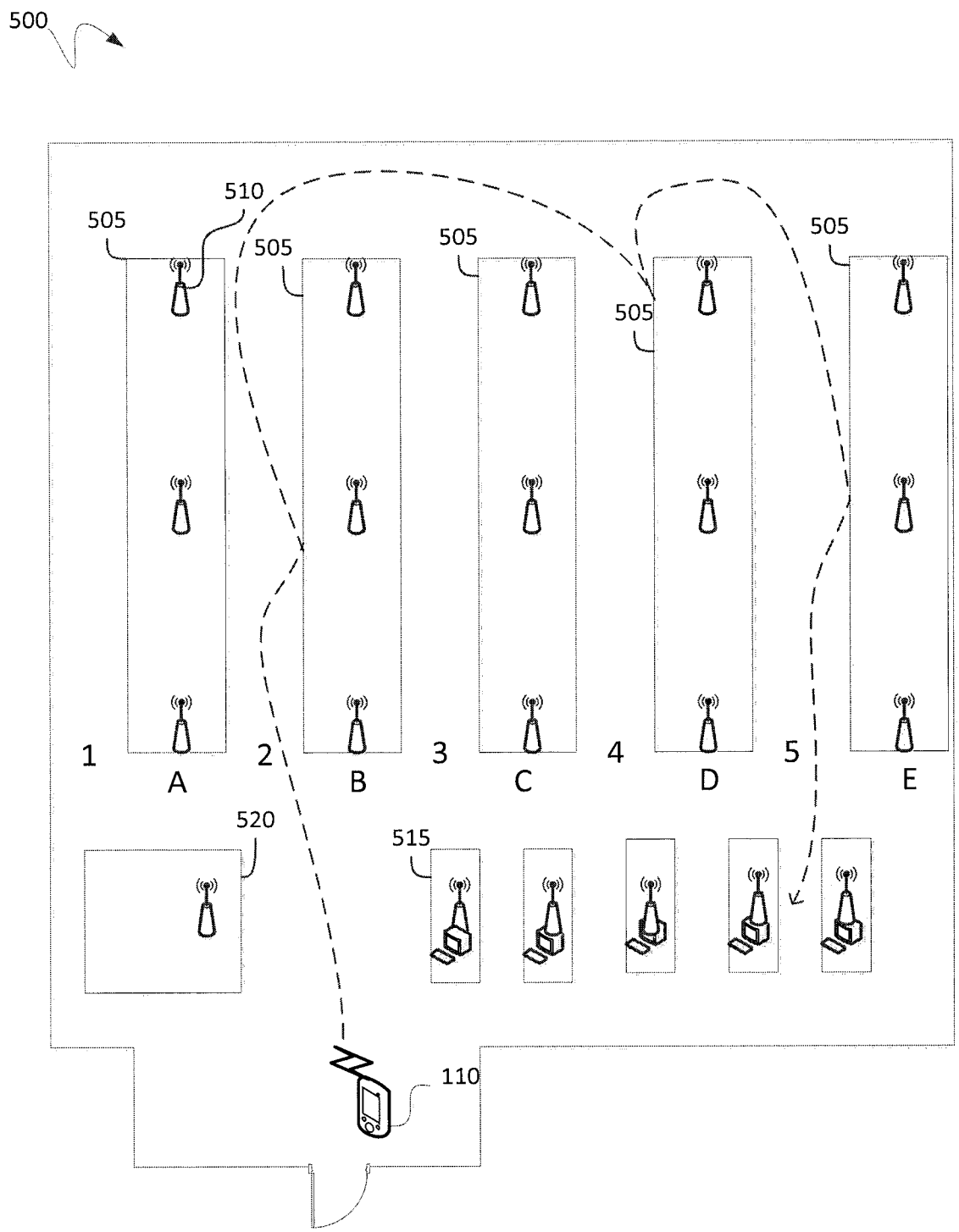
FIG. 5 is a diagram depicting a floor layout of a merchant store according to one embodiment.

As shown in FIG. 5, as an example, each shelf 505 in the store may have three Bluetooth beacons 510: one at the front section, one at the middle section, and one at the rear section. Each checkout counter 515 also may have a Bluetooth beacon 510. Further, one Bluetooth beacon 510 may be installed at a customer service counter 520 near the entrance of the store. The network of Bluetooth beacons 510 may be connected to merchant device 140. Each Bluetooth beacon 510 may emit a low energy Bluetooth signal with specific frequency spectrum. User 105 may carry a user device 110 including a Bluetooth device configured to communicate via low energy Bluetooth communication. When user 105 enters the merchant's store, user device 110 may detect Bluetooth beacons 510 installed near the store's entrance, such as the Bluetooth beacon 510 at customer service counter 520 and the Bluetooth beacon 510 at a checkout counter 515. Thus, the position of user device 110 may be determined based on which Bluetooth signals are received and the respective signal strength of the signals.

The position of user device 110 may be determined using techniques, such as triangulation or location fingerprint. In the triangulation technique, the location of user device 110 may be determined based on the locations of three or more Bluetooth beacons 510 and the distance of user device 110 from the three or more Bluetooth beacons 510. The locations of the Bluetooth beacons 510 may be predetermined when the Bluetooth beacons 510 are installed on the shopping floor of the store. The distance between the Bluetooth beacons 510 and user device 110 may be determined based on the signal strength received between the Bluetooth beacons 510 and user device 110. For example, a stronger signal may indicate a shorter distance while a weaker signal may indicate a longer distance. Thus, based on the Bluetooth signals between the Bluetooth beacons 510 and user device 110, the location of user device 110 may be determined using the triangulation technique.

In the location fingerprint technique, a database of signal fingerprints at various locations on the shopping floor may be predetermined. For example, a signal profile may be predetermined for each location. The signal profile may include Bluetooth signals that are detected at that location and the strength of each of those detected Bluetooth signals. For example, when user device 110 is at the middle of aisle 2, a signal profile may be predetermined to indicate strong signals from Bluetooth beacons 510 installed at the middle sections of Shelf A and Shelf B, and weak signals from Bluetooth beacons 510 installed at the end sections of Shelf A and Shelf B and middle section of Self C. A database of signal profiles associated with respective locations on the shopping floor may be predetermined and stored. Thus, based on a signal profile detected by user device 110, a location of user device 110 may be determined by referencing the database of signal profiled.

In some embodiments, the signal profile may be the Bluetooth signal of user device 110 received by respective Bluetooth beacons. For example, when user device 110 is at the middle of aisle 2, a signal profile may be predetermined to indicate strong signals received at Bluetooth beacons 510 installed at the middle sections of Shelf A and Shelf B, and weak signals received at Bluetooth beacons 510 installed at the end sections of Shelf A and Shelf B and middle section of Self C. Thus, the signal fingerprints may be signals received at user device 110 or signals received at the respective Bluetooth beacons 510.

The location of user device 110 may be determined by user device 110. For example, user device 110 may download a layout map of the merchant store and may determine user device 110's position based on the Bluetooth signals detected and the floor layout of the Bluetooth beacons 510. In some embodiments, merchant device 140 may determine the location of user device 110 based on which Bluetooth beacons 510 detect user device 110 and the strength of the signal detected at the Bluetooth beacons 510. In some embodiments, the detected signals and signal strengths may be forwarded to payment provider server 170 and payment provider server 170 may determine the location of user device.

The position of user device 110 may be monitored continuously, e.g., every few seconds, to track the movement of user device 110 in the store. Thus, a movement of user 105 on the shopping floor may be monitored. By tracking the movement of consumers on the shopping floor, the consumers' shopping habits or preferences may be analyzed to improve shopping experience and increase sales. For example, by tracking consumer movements or shopping routes, the system may determine which routes are most and/or least taken by shoppers and where shoppers like to linger or spend time. These statistics may be used to improve floor layout and/or determine product placements. Advertisements also may be presented to the consumer at proper locations.

At step 208, locations where user 105 picks up merchandise may be determined. For example, user 105 may use a digital shopping list on user device 110 as a reminder to pick up items listed on the shopping list. When user 105 picks up an item from a store shelf, user 105 may cross out, check off, or otherwise indicate pick up of the item listed on the digital shopping list. User device 110 may detect the crossing out operation of user 105 as an indication that the item has been picked up by user 105 at user 105's location. Thus, user device 110 may mark that location as the location where that specific item has been picked up, e.g., a "dropped pin" location. User device 110 may store the pickup location along with the identity of the item. Thus, user device 110 may remember which item is picked up at that location.

For example, as shown in FIG. 5, user 105 may stop in the middle of aisle 2 and may pick up eggs from a middle section of shelf B. User 105 then may cross out eggs from the shopping list. User device 110 may detect that eggs have been crossed out from the shopping list when user device 110 is at the middle of aisle 2 and may store the location of the middle of aisle 2 as the location where eggs have been picked up. Thus, user device 110 may determine the location of eggs in the store by detecting user 105's interaction with the shopping list.

In some embodiments, product shelves may be provided with weighing devices configured to weigh the products placed on the shelves. The weighing devices may be connected with merchant device 140. When user 105 picks up a product from a shelf, the weight on the shelf may change. Thus, merchant device 140 may detect merchandize pick up by weight changes at the shelf. In particular, a weight different may be used to identify the product that has been removed from the shelf. In another embodiment, items may have tags or other communication devices attached to monitor movement, such as pick up. In such cases, an item may detect that it has been picked up and placed in a cart or basket, such as by RFID or other NFC communications. The item can then be matched to the shopping list and a matching item be marked as picked up automatically, without the user having to manually check off the item. This also ensures accurate locations of where the user picked up specific items on the shopping list.

In some embodiments, merchant device 140 may maintain a product placement database indicating where each product is placed in the store and may determine the identity of the product picked up by user 105 by referencing the product placement database. Further, merchant device 140 may store the location where a product has been picked up by user 105. For example, user 105 may pick up a dozen eggs from the middle section of shelf B. A weighing device provided at the egg section of shelf B may detect a decrease in weight. Thus, based on the weight change, merchant device 140 may determine that an egg product has been picked up at the middle section of shelf B. In some embodiments, merchant device 140 may notify user device 110 regarding the egg pickup and user device 110 may automatically cross out the egg item on the shopping list for user 105.

By detecting where various items are picked by various shoppers, the system may map various items on the shopping floor. Thus, even if a map of the locations of items is not provided to the system, the system may determine their locations by where these items are picked by different consumers using crowd sourcing.

At step 210, a shopping route based on the shopping list and merchandise pickup locations may be determined. For examples, based on the location and movement of user device 110, the locations where various merchandise were picked up, and the shopping list, a shopping route may be constructed after user 105 finishes shopping and checks out of the store. As shown in FIG. 5, user 105 may walk through aisle 2 to pick up eggs at a middle section of shelf B and carrots at a rear section of shelf A, walk through a rear aisle of the store to reach a rear section of shelf D, no merchandise pickup at shelf D, walk through aisle 5 and pick up cheese at a middle section of shelf E, and finally check out at the checkout counter. Thus, a shopping route, shown as a dashed line, may be constructed from user 105's shopping trip. This shopping route may be associated with user 105's shopping list including items of eggs, carrots, and cheese. Thus, the shopping list and the shopping route may be stored to be referenced in the future for suggesting shopping routes to user 105 or other users.

In some embodiments, the shopping route may be modified. For example, although user 105 visited a rear section of aisle 4, no merchandise was picked up at aisle 4. Thus, the shopping route may be modified to eliminate the route to aisle 4. Thus, the dashed line would extend directly from aisle 2 to aisle 5 without entering aisle 4. This modification may correct any portion of the shopping route in which user simply wanders or browses without making merchandise pickup. In other embodiments, the routes that have no merchandise pickup may be analyzed to determine whether user 105 was having difficulty finding a product or the product has been depleted from the product shelves which require restocking.

At step 212, the shopping route may be stored for future reference. For example, the shopping routes may be stored with their corresponding shopping lists. The stored shopping routes may be used to suggest shopping routes to users. In some embodiments, the shopping routes may be used to analyze consumer's shopping habits and preferences to improve shopping experience or for target advertisements.

At step 214, the shopping lists and shopping routes may be shared with other consumers. For example, user 105 may share the shopping route with another user, such as a family member. Thus, when user 105 is not available to go shopping, user 105 may readily share the shopping list and the shopping route with a family member who may go shopping on user 105's behave. The family member may use the shared shopping list and the shopping route to navigate through the store and to ensure all items on the shopping list are picked up and purchased. Thus, even though the family member has never shopped at the store, the family member may still shop efficiently and pick up all desired items by following user 105's shared shopping list and shopping route.

In some embodiments, the shopping route may be shared in real time. For example, user 105 may share user 105's shopping route with a family member while user 105 is shopping in the store. Thus, the family member may monitor user 105's shopping progress in real time. In particular, the family member may see where user 105 is moving and which items are being picked up. Thus, the family member may provide comments and suggestions to user 105 while user 105 is shopping and give approvals to the items picked up by user 105. As such, the family member and user 105 may have a shared shopping experience.

By using the above process 200, a consumer's in-store shopping routes may be monitored. In particular, locations of merchandise pickup may be detected based on crossing-out of items from shopping lists, detection of item movement, or based on weight changes detected by weighing devices provided at product shelves. Shopping routes may be stored and associated with corresponding shopping lists for future reference. Further, shopping lists and shopping routes may be shared among users to enhance shopping experience.

Figure 3:
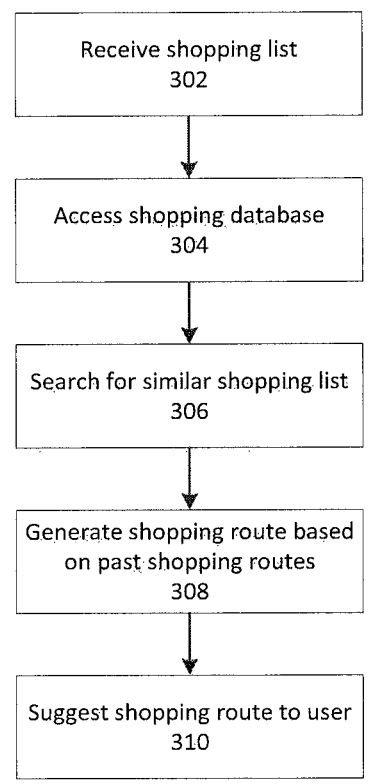
FIG. 3 is a flowchart showing a process for suggesting shopping routes according to one embodiment.

FIG. 3 is a flowchart showing a process for suggesting shopping routes according to one embodiment. At step 302, user device 110 may receive a shopping list. The shopping list may be entered by user 105. In some embodiments, the shopping list may be received from a friend or a family member of user 105. For example, the shopping list may be received via a social network server, an email message, a text message, or the like.

At step 304, user device 110 may access a shopping database maintained at merchant device 140 or at payment provider server 170. The shopping database may include shopping routes taken by user 105 and/or other users at various merchant stores. The shopping routes may be associated with respective shopping lists. For example, these shopping routes may be collected from process 200.

At step 306, the shopping database may be searched to find similar shopping lists. For example, shopping lists from the shopping database that contain items similar to that of the received shopping list may be identified. Further, shopping lists for merchants located near user device 110 may be prioritized. In one embodiment, user 105 may be inquired to identify the merchant where the items on the received shopping list are to be purchased. In this case, shopping lists from the identified merchant may be retrieved from the shopping database.

At step 308, a shopping route may be generated for the received shopping list based on the shopping routes stored in the shopping database. In particular, the shopping routes associated with the similar shopping lists found in the shopping database may be used to generate the shopping route for the received shopping list. For example, if one or more shopping lists identical to the received shopping list from the merchant are found in the shopping database, the shopping routes associated with the found identical shopping lists may be suggested to user 105. In some embodiments, the shopping routes associated with the found shopping lists may be modified to improve the shopping route. For example, portions of shopping routes in which no merchandise pickup occurred may be removed to generate a more efficient shopping route.

If no shopping list identical to the received shopping list is found in the shopping database, shopping routes associated with similar shopping lists from the shopping database may be merged to generate a shopping route that include at least all items on the received shopping list. Portions of the merged shopping route for picking up items no included in the received shopping list may be removed. Thus, a new shopping route may be generated by merging shopping routes associated with similar shopping lists, even when no identical shopping lists are found.

In some embodiments, when a shopping route is generated for the received shopping list, other products along the shopping route may be identified and suggested to user 105. In particular, other products related to the items on the shopping list may be suggested to user 105. For example, if coffee is on the shopping list, coffee crèmes that are placed along the shopping route may be suggested to user 105. Thus, other products related to the products listed on the shopping list and that are placed along the shopping route may be suggested to user 105 for convenience. At step 310, the generated shopping route for the received shopping list may be suggested to user 105.

By using the above process 300, a shopping route may be generated based on a shopping list to help navigate a consumer through a store. In particular, the shopping routes may be generated by crowd-sourcing based on other shopping routes taken by other consumers to generate a most efficient route. Further, other products related to the items on the shopping list may be suggested to the consumer to enhance shopping experience.

The above processes 200 and 300 may be executed by user device 110. In some embodiments, the processes 200 and 300 may be executed at merchant device 140 or payment provider server 170. In some other embodiments, above processes 200 and 300 may be executed by one or more of user device 110, merchant device 140, and payment provider server 170 in coordination with each other.

The following are exemplary scenarios in which the above processes 200 and 300 may be implemented.

EXAMPLE 1

A primary shopper in a household typically buys groceries at A-Mart. The primary shopper uses a shopping application on a mobile device to create shopping lists for items to be purchased at A-Mart. The shopping application allows the mobile device to interact with a server of a payment service provider or a server of A-Mart. When the primary shopper uses a shopping list to buy groceries at A-Mart, a shopping route of the primary shopper may be monitored using a network of Bluetooth beacons installed in A-Mart. Thus, the movement of the primary shopper and the locations where various items on the shopping list are picked up may be monitored. The primary shopper's shopping routes are stored for future references. Further, various items related to the items on the shopping list may be suggested to the primary shopper.

One day, the primary shopper is not available to go buy groceries at A-Mart due to a social obligation. Thus, the primary shopper requests that a family member to go buy groceries instead. The primary shopper shares the shopping list with the family member by sending the shopping list to the family member's mobile device. Similarly, the family member's mobile device has the shopping application. Thus, the family member's mobile device receives the shopping list and the shopping application generates a shopping route based on the shopping list received from the primary shopper. In particular, the shopping application generates the shopping route based on previous shopping routes taken by the primary shopper, such that a familiar and efficient shopping route is generated.

When shopping at A-Mart, the family member also decides to share the shopping progress with the primary shopper in real time. Thus, the movement and locations of the family member are monitored by the network of Bluetooth beacons in A-Mart. The movement and locations of the family member are forwarded to the primary shopper in real time. Thus, the primary shopper may monitor the family member's shopping progress using the mobile device. In particular, the primary shopper may make suggestions and comments on the family member's shopping activities. Further, the primary shopper may approve the items picked up by the family member to ensure that the correct items are picked up.

The family member is able to perform the shopping task with the same efficiency based on the shared shopping route of the primary shopper. Further, by receiving approval from the primary shopper in real time, the family member is able to purchase all items correctly.

EXAMPLE 2

A consumer is new to a neighborhood and has never shopped at A-Mart. The consumer uses a shopping application on a mobile device to compose a new shopping list. The new shopping list may be analyzed and a shopping route database may be searched to find prior shopping lists similar to the consumer's new shopping list. Thus, a new shopping route may be generated for the new shopping list based on other consumer's prior shopping routes at A-Mart. The consumer may use the newly generated shopping route as a shopping guide at A-Mart.

When the consumer is shopping at A-Mart, the movement and location of the consumer in A-Mart may be monitored. Thus, other items related to items on the consumer's shopping list may be suggested to the consumer. In particular, the suggested items may be located along the consumer's shopping route and be suggested to the consumer when the consumer is near the location of the items. Thus, the consumer may pick up items efficiently at A-Mart even though the consumer is new in the store. Further, other items may be suggested to the consumer for convenience. As the consumer continues to shop at A-Mart more frequently, the shopping routes suggested to the consumer may continue to be updated and improved overtime based on new items or locations in the store and the consumer's updated preference.

Figure 4:
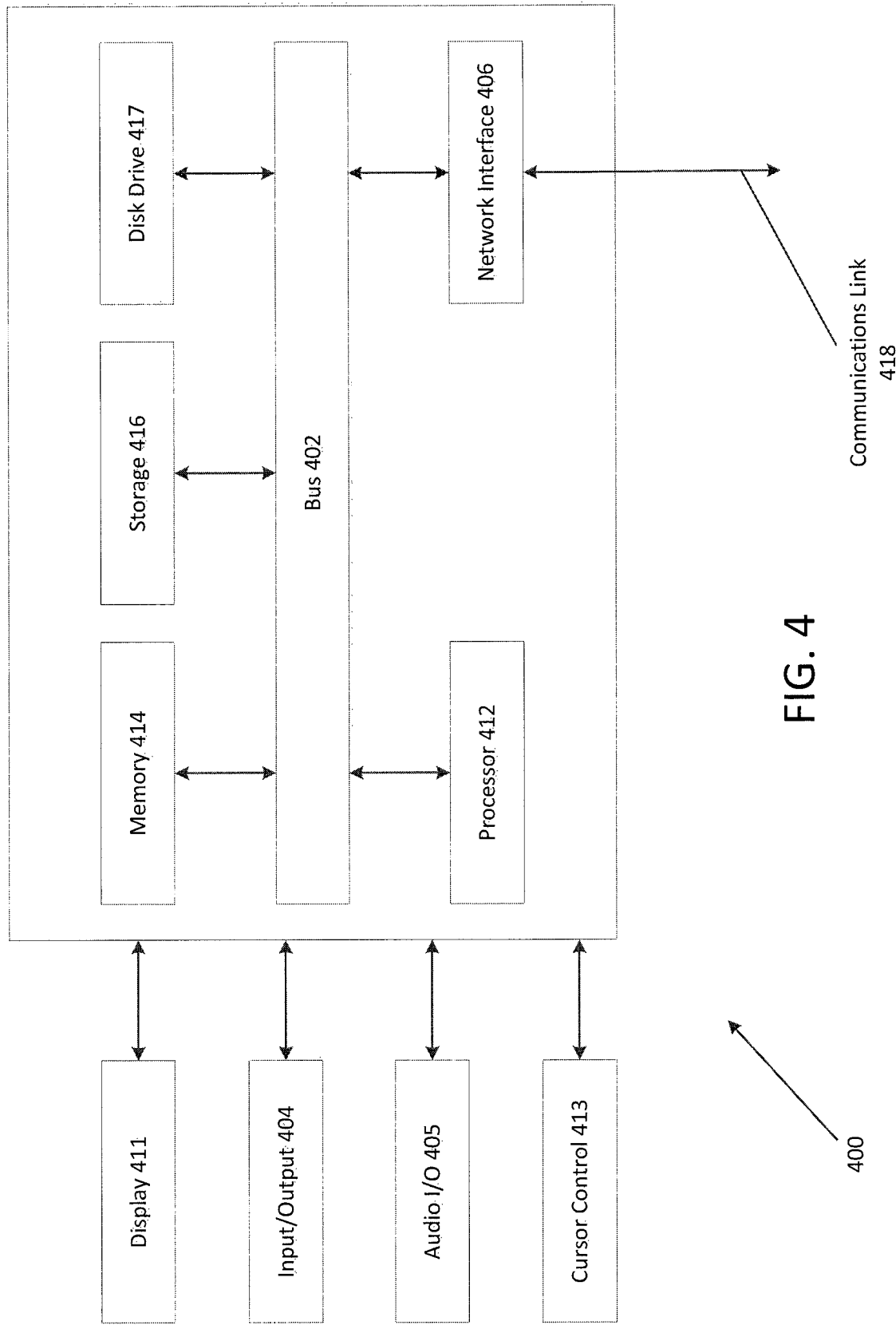
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory; and
    one or more hardware processors coupled to the non-transitory memory and configured to read instructions from the non-transitory memory to cause the system to perform operations comprising:
        accessing a first digital shopping list that includes one or more items to be purchased at a merchant store;
        monitoring a movement of a first user in the merchant store by communicating with a device of the first user via one or more beacons that each emit a Bluetooth signal in the merchant store, wherein the monitoring comprises determining a position of the first user based on a strength of the Bluetooth signal received by the device of the first user;
        identifying, based on RFID communications or NFC communications conducted between the device of the first user and one or more devices at the merchant store, or based on a weight change at a shelf of the merchant store, a first item of the one or more items that has been picked up by the first user;
        in response to the identifying, automatically crossing off or removing the first item from the first digital shopping list;
        determining, without a map of the merchant store, one or more locations in the merchant store corresponding to the one or more items on the first digital shopping list, wherein the determining of the one or more locations comprises:
            determining a first location of the device of the first user where the first item was picked up by the first user; and
            electronically associating the first location with the first item;
        determining a first shopping route traveled by the first user for the first digital shopping list based on the determined one or more locations;
        accessing a second digital shopping list from a second user for shopping at the merchant store;
        generating a second shopping route for the second digital shopping list at least in part based on the first shopping route and items in the second digital shopping list;
        sending the second shopping route to a device of the second user;
        monitoring a movement of the second user in the merchant store by communicating with the device of the second user via the one or more beacons;
        identifying one or more items picked up by the second user at the merchant store;
        causing the device of the first user to display, in real time, the movement of the second user and the one or more items picked up by the second user; and
        causing the device of the second user to display comments of the first user with respect to the movement of the second user or the one or more items picked up by the second user.

2. The system of claim 1, wherein the determining the first shopping route includes:
    determining a first route to the first location.

3. The system of claim 1, wherein the determining the one or more locations further comprises:
    repeating the identifying, the determining the first location, and the electronically associating for a plurality of further digital shopping lists belonging to a plurality of users other than the first user, respectively; and
    constructing, based on the repeating, a map of the merchant store that maps the one or more items to the one or more locations in the merchant store.

4. The system of claim 1, wherein when the identifying is based on the weight change, the weight change is detected by a weighing device of the merchant store.

5. The system of claim 1, wherein the monitoring of the movement further comprises using triangulation techniques to determine the movement of the device of the first user.

6. The system of claim 1, wherein the operations further comprise:
    sharing the first shopping route of the first user with the second user or a third user.

7. The system of claim 1, wherein the operations further comprise:
    sending information regarding the movement of the first user in the merchant store and the one or more items picked up by the first user to the device of the second user.

8. The system of claim 1, wherein the operations further comprise:
    storing the first shopping route associated with the first digital shopping list in a shopping database.

9. The system of claim 1, wherein the determining the position of the first user comprises:
    accessing an electronic database storing a plurality of Bluetooth signal profiles associated with a plurality of positions within the merchant store, respectively, wherein each of the Bluetooth signal profiles corresponds with a set of strengths of the Bluetooth signals; and
    determining the position of the first user by matching the strengths of the Bluetooth signals received by the device of the first user with one of the Bluetooth signal profiles.

10. A non-transitory machine-readable medium having stored thereon machine-readable instructions executable to cause a machine to perform operations comprising:
    receiving a first shopping list including items be purchased at a merchant store;
    monitoring a movement of a first user by detecting a location of a first communication device of the first user in the merchant store using a network of Bluetooth beacons that emit Bluetooth signals, wherein the monitoring comprises determining a location of the first communication device based on respective a strength of the Bluetooth signals received by the first communication device;

determining that RFID communications or NFC communications have been conducted between the device of the first user and one or more devices at the merchant store;

identifying, based on the determining, a first item of the items that has been picked up by the first user;

in response to the identifying, automatically crossing off or removing the first item from the first shopping list;

determining, without a map of the merchant store, one or more locations in the merchant store corresponding to one or more items on the first shopping list, wherein the determining of the one or more locations comprises:
    determining a first location of the first communication device of the user where the first item was picked up by the first user; and
    electronically associating the first location with the first item;

determining a first shopping route traveled by the first user for the first shopping list based on the determined one or more locations;

accessing a second digital shopping list from a second user for shopping at the merchant store;

generating a second shopping route for the second digital shopping list at least in part based on the first shopping route and items in the second digital shopping list;

sending the second shopping route to a second communication device of the second user;

monitoring a movement of the second user in the merchant store by communicating with the second communication device via the one or more beacons;

identifying one or more items picked up by the second user at the merchant store;

causing the first communication device to display, in real time, the movement of the second user and the one or more items picked up by the second user; and causing the second communication device to display comments of the first user with respect to the movement of the second user or the one or more items picked up by the second user.

11. The non-transitory machine-readable medium of claim 10, wherein the determining the location of the first communication device comprises:
    accessing an electronic database storing a plurality of Bluetooth signal profiles associated with a plurality of positions within the merchant store, respectively, wherein each of the Bluetooth signal profiles corresponds with a set of strengths of the Bluetooth signals; and
    determining the position of the first user by matching the strengths of the Bluetooth signals received by the device of the first user with one of the Bluetooth signal profiles.

12. The non-transitory machine-readable medium of claim 10, wherein the operations further comprise:
    sending information regarding the movement of the user in the merchant store and items picked up by the first user to the second user.

13. A method comprising:
accessing a first digital shopping list that includes one or more items at a merchant location;
tracking a movement of a first user in the merchant location by communicating with a first device of the first user via one or more beacons in the merchant location, the one or more beacons emitting Bluetooth signals having different frequency spectra, wherein the tracking comprises determining a position of the first user based on respective strengths of the Bluetooth signals received by the first device;

identifying, based on a weight change at a shelf of the merchant location, a first item of the one or more items that has been picked up by the first user;

in response to the identifying, automatically crossing off or removing the first item from the first digital shopping list;

determining, without a map of the merchant location, one or more areas in the merchant location corresponding to the one or more items on the first digital shopping list, wherein the determining of the one or more areas comprises:
    determining a first area of the first device where the first item was picked up by the first user; and
    electronically associating the first area with the first item;

determining a first shopping route traveled by the first user for the first digital shopping list based on the determined one or more areas;

accessing a second digital shopping list from a second user for shopping at the merchant location;

generating a second shopping route for the second digital shopping list at least in part based on the first shopping route and items in the second digital shopping list;

sending the second shopping route to a second device of the second user;

tracking a movement of the second user in the merchant location by communicating with the second device via the one or more beacons;

identifying one or more items picked up by the second user at the merchant location;

electronically communicating, to the first device and in real time, the movement of the second user and the one or more items picked up by the second user; and electronically communicating, to the second device, comments of the first user with respect to the movement of the second user or the one or more items picked up by the second user.

14. The method of claim 13, wherein the determining the first shopping route includes:
    determining a first route to the first area corresponding to the first item of the one or more items.

15. The method of claim 13, wherein the determining the one or more areas further comprises:
    repeating the identifying, the determining the first area, and the electronically associating for a plurality of further digital shopping lists belonging to a plurality of users other than the first user, respectively; and
    constructing, based on the repeating, a map of the merchant location that maps the one or more items to the one or more areas in the merchant location.

16. The method of claim 15, wherein the weight change is detected by a weighing device at the merchant location.

17. The method of claim 15, wherein the tracking of the movement further comprises using triangulation techniques to determine the movement of the first user.

18. The method of claim 13, further comprising:
    sending information regarding the movement of the first user in the merchant location and the one or more items picked up by the first user to the second device.

19. The method of claim 13, wherein the determining the position of the first user comprises:

accessing an electronic database storing a plurality of Bluetooth signal profiles associated with a plurality of positions within the merchant location, respectively, wherein each of the Bluetooth signal profiles corresponds with a set of strengths of the Bluetooth signals; and determining the position of the first user by matching the strengths of the Bluetooth signals received by the first device with one of the Bluetooth signal profiles.

\* \* \* \* \*